United States Patent [19]

Savich et al.

[11] Patent Number: 4,609,367

[45] Date of Patent: Sep. 2, 1986

[54] BAG MAKING MACHINE AND METHOD

[75] Inventors: Peter P. Savich, Longmeadow, Mass.; Paul Ziegelhoffer, Greenbay, Wis.

[73] Assignee: Union Carbide Corporation, Danbury, Conn.

[21] Appl. No.: 675,561

[22] Filed: Nov. 28, 1984

[51] Int. Cl.$^4$ .................. B31B 23/10; B31B 23/16; B31B 23/64

[52] U.S. Cl. .................................. 493/194; 493/203; 493/205; 493/236; 156/515; 83/337; 226/171; 226/175

[58] Field of Search ............... 493/194, 197, 203, 205, 493/236; 156/515; 83/337; 226/171, 175

[56] References Cited

U.S. PATENT DOCUMENTS

| 3,004,881 | 10/1961 | van der Meulen | 156/253 |
| 3,602,140 | 8/1971 | Sudduth | 101/420 |
| 3,635,779 | 1/1972 | Cooper | 156/542 |
| 3,867,873 | 2/1975 | Simpson et al. | 493/203 |
| 3,901,754 | 8/1975 | Simpson et al. | 156/251 |
| 4,115,183 | 9/1978 | Achelpohl et al. | 156/515 |
| 4,198,259 | 4/1980 | van der Meulen | 156/498 |
| 4,331,502 | 5/1982 | Achelpohl et al. | 156/515 |

FOREIGN PATENT DOCUMENTS

1054644  1/1967  United Kingdom ............ 493/197

Primary Examiner—Francis S. Husar
Assistant Examiner—William E. Terrell
Attorney, Agent, or Firm—Roger Aceto

[57] ABSTRACT

Apparatus for making bags from a folded web of thermoplastic material includes a rotating drum to which the web is continuously applied. As the drum rotates through a given arc length, the web is tucked outwardly from the periphery of the drum in progressively deeper folds wherein the depth of tuck determines the width of the bag. A cam, controlling the depth of tuck is movable in a rectilinear radial direction for adjusting the depth of tuck, thereby controlling the bag width.

10 Claims, 10 Drawing Figures

BAG MAKING MACHINE AND METHOD

BACKGROUND OF THE INVENTION

The present invention relates generally to apparatus for making bags from a U-folded web of heat-sealable material, and more particularly, to apparatus for controlling the width of plastic bags made on rotary bag making machines.

Rotary bag making machines are well known in the art. Typically, these machines include a rotating drum having a plurality of sealing stations equally spaced about the drum periphery. A web of thermoplastic material, folded in the machine direction to form what is known in the art as a U-folded web, is continuously fed onto the sealing stations at the drum periphery.

Clamp bars, moved into registry with the sealing stations and against the U-folded web, act to hold the web at the sealing stations as the drum rotates. During the course of rotation, a heated wire, carried by the drum at each sealing station, moves against the web. The wire cuts through the two layers of the U-folded web and simultaneously welds the severed layers together to form a seam. This forms a bag wherein the fold in the web defines the bottom of the bag and the side edges of the bag are formed at the welded seams.

A plurality of heated wires are carried by the drum, one wire being associated with each station. Movement of the wires against the web can be controlled by a suitable cam, wherein the drum, in rotating about the cam, causes the wires to move, with respect to the drum surface and at the appropriate intervals into and out of engagement with the web.

The machine, as described thus far, is conventional and produces a bag which is as deep as the folded web and as wide as the peripheral distance between adjacent sealing stations.

With prior art apparatus, the depth of the bag is changed by slitting the web to an appropriate width prior to folding it. However, changing the bag width is not possible except by welding and severing at every second or third sealing station, for example, to double or triple the width of the bag.

Bag making apparatus as typified, for example, by U.S. Pat. No. 4,331,502 and 4,115,183, among others, utilize a tucking mechanism for increasing the rate of production. In this respect, the sealing stations are closely spaced about the periphery of the rotating drum and a tucking mechanism operates to tuck the web inwardly from the periphery of the drum. In this apparatus, the depth of the tuck, determines the width of the bag. The means for controlling the depth of the tuck, as described in these patents, is a fixed cam track which is arranged so that rotation of the drum with respect to the track causes roller members to move inwardly from the periphery of the drum.

One disadvantage of the '502 and '183 bag making machines is the uncertainty in predicting an exact dimension between the welded seams forming the side edges of the bag. In this respect, the thermoplastic web shrinks or "pulls back" from the heated edge. The amount of this shinkage depends upon a number of variables such as the heat generated by the hot wire, the thickness of the thermoplastic web and the composition of the web, among others. Accordingly, when designing a bag making machine for a particular width of bag, these factors are all taken into consideration. However, the final dimensions of the bag are not likely to be known until the machine is actually put into operation. Even then, the width of the bag may vary as conditions change during the course of the run, or as thermoplastics of slightly different compositions are used. Accordingly, a machine designed for a specific size of bag may be found to produce either oversize or undersize bags when the machine is actually put into production.

Even though the bag actually produced by the machine may be oversized or undersized by as little as fractions of an inch, either situation is undesirable. In this respect, it may be deceptive to advertise a bag which is under a desired size, as being the desired "full" size; as for example, to say a bag which measures only 6 and ⅞ inches as being a seven inch bag.

On the other hand, if the bag is over sized, material is being wasted in the manufacture of the bag. For example, it is not uncommon to manufacture bags at the rate of hundreds per minute. At these rates, even fractions of an inch per bag translates to losses in excess of hundreds of feet of material per hour.

In prior art machines having just a rotating drum and with no tucking mechanism, there is no practical method of correcting for undersized or oversized bags. With machines of the prior art, using a tucking apparatus, the only practical manner of correcting bag size is to recut that portion of the cam controlling the tucking apparatus. This procedure is not only costly, but results in expensive downtime of the machine while the cam is being recut.

Another drawback of machines of the prior art is the inability to manufacture bags in sizes other than multiples of the size for which the machine was manufactured. For example, with prior art machines one could manufacture bags which are double or triple width simply by sealing and severing the bag at every second or third sealing station. However, it is difficult, if not impossible, to manufacture one size of bag, and then adjust the machines for manufacturing another bag which is not a multiple width of the first bag.

The bag making machine of the present invention is of the type utilizing a tucking mechanism for tucking the thermoplastic web radially with respect to the periphery of the drum. Prior art apparatus, as typified by the patents mentioned above, and which use a fixed cam to operate the tucker mechanism for tucking the web inwardly from the periphery of the drum, have certain limitations. For example, space restrictions towards the center of the drum severely limit both the number of tucking stations for a given size drum and the maximum depth of tuck. Also, application of the web onto the drum is difficult with inward tucking because the tucking members must be moved aside to permit the web to have access to the periphery of the drum.

In the present invention, the drawbacks of the prior art tucking apparatus are obviated by arranging the tucking members, and the cam, to tuck the web outwardly from the periphery of the drum. With this outward tucking arrangement the spacing limitations decrease as the tuck length increases. In addition, outward tucking readily accommodates an increase or decrease in the depth of tuck without creating mechanical interference during application of the web to the sealing stations on the periphery of the drum, and it accommodates the application of the web to the drum without interference from the tucking members. Also, with outward tucking, the tucking members can be retracted from the position of full tuck in order to relieve tension on the web just prior to severing and sealing the web. As a further feature, the cam can be made adjustable so as to facilitate changing, or correcting, the tucked depth and therefore the width of the bag.

SUMMARY OF THE INVENTION

The bag making apparatus of the present invention may be characterized in one aspect thereof by the provision of a rotatable drum for receiving a web of thermoplastic material continuously supplied to the periphery of the drum, tuck rollers carried by the drum for tucking the web with respect to the drum periphery, clamp bars for clamping the web at spaced intervals to the drum periphery and hot wire means carried by the drum for severing and sealing the web at the clamped intervals wherein the improvement comprises:

(a) support means mounting the tucker rolls to the drum for rectilinear radial movement along a path of travel from and between the drum periphery and an outwardly extending position spaced from and beyond the drum periphery; and (b) cam means for moving the tucker rolls to the outwardly extending position after the web has been supplied to the drum periphery thereby contacting the tucker rolls against the surface of the web which faces the drum periphery and tucking the web outwardly from the drum periphery.

In its method aspect the invention involves the steps of:

(a) providing the drum with tucker rolls spaced about the drum periphery, each tucker roll being movable radially to a position spaced outwardly from and beyond the drum periphery;

(b) feeding the web on to the drum periphery and across the tucker rolls;

(c) moving the tucker rolls to the radially outward position thereby contacting each tucker roll against the web surface facing the drum periphery and tucking the web outwardly from the drum periphery;

(d) clamping the web to the drum periphery between the tucked portions, (e) returning the tucker rolls towards the drum periphery; and (f) passing a hot wire through the web at the clamped locations after the tucker rolls have begun to return towards the drum periphery thereby severing and sealing the tucked web positions to form the bags.

DESCRIPTION OF PREFERRED EMBODIMENTS

Figure 1:
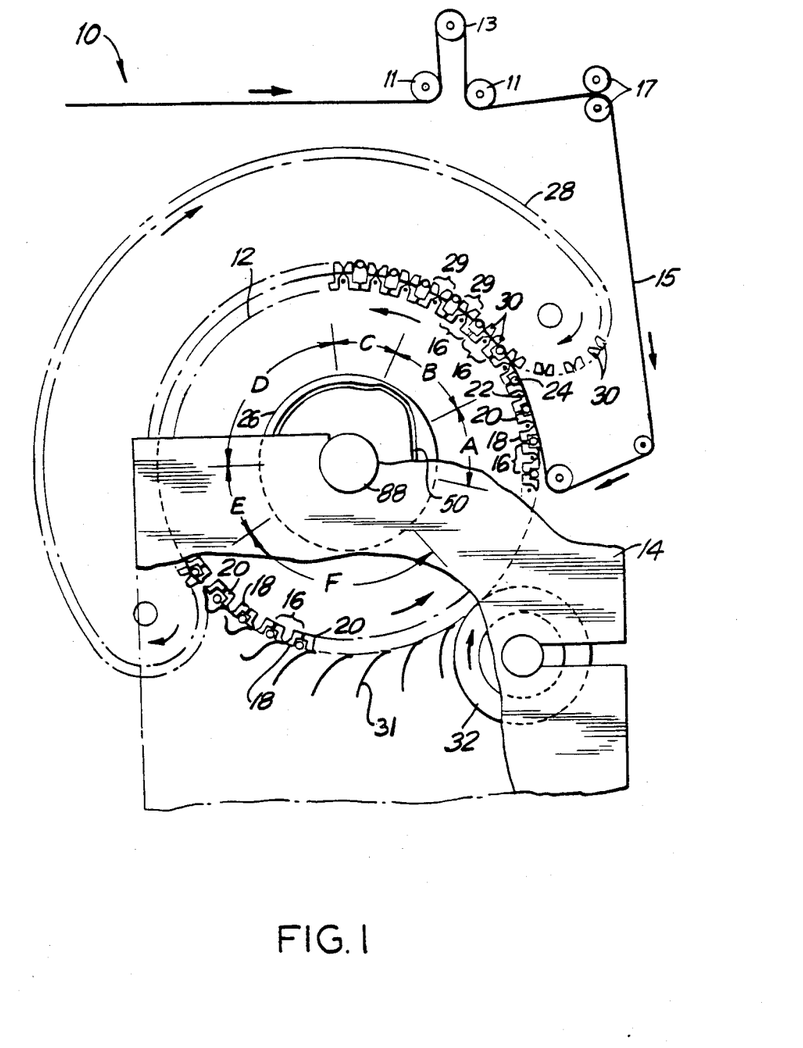
FIG. 1 is a schematic view, partly broken away, showing selected components of the bag making apparatus incorporating the present invention.

Referring to the drawings, FIG. 1 shows the bag making apparatus generally indicated at 10 which incorporates the present invention. Briefly, this apparatus includes a drum 12 which is mounted to a frame 14 for rotation about a longitudinal axis, the axle of the drum being indicated at 88.

As the drum rotates about its longitudinal axis, it passes through a succession of zones identified by the letters A–F. Various operations are performed in each zone in order to make bags out of a U-folded web 15 of thermoplastic material continuously supplied to the surface of the drum. It should be noted, that for purposes of illustrating the invention, web 15 is shown in a heavy line which is out of proportion to its actual size. In practice the U-folded web may be only a mil thick.

The zones include a lay-on zone A where web 15 is first laid onto the surface of the rotating drum. Next, in order, is a tucking zone B, a clamping/tension relieving zone C, a severing/sealing zone D, a cooling zone E, and a take-off zone F.

Disposed at spaced intervals about the periphery of the drum are a plurality of sealing stations 16. Each sealing station is formed by an associated pair of drum sealing bars 18, 20 which extend across the drum and are spaced apart by an amount sufficient to permit the passage of a sealing wire 22. For purposes of reference, sealing bar 20 would be leading, and sealing bar 18 would be trailing, in the direction of the rotation of drum 12.

Between each sealing station 16 is located a tucking roll 24. Each tucking roll has a nested or home position which is below the peripheral surface of drum 12 as shown in zone A. As the drum rotates through successive zones, the tucking rolls 24 are moved radially outward to a position spaced out from and beyond the periphery of the drum for purposes set out hereinbelow.

A cam 26 is fixed to the frame 14 to provide the appropriate radial movement of each tucking roll 24. While not shown in FIG. 1, a similar cam arrangement controls the radial movement of sealing wires 22.

Disposed about the periphery of drum 12 and extending generally from the tucking zone B to take-off zone F, is an endless chain, shown schematically at 28. This chain carries a plurality of clamp bar assemblies 29 which extend across the drum and register with a corresponding sealing station 16. Each clamp bar assembly includes a pair of spaced clamp bars 30. The approach of the endless chain 28 and its clamp bar assemblies 29 to the periphery of drum 12 is controlled by a cam track (not shown). With this cam track arrangement the clamp bar assemblies 29 are positioned close to the drum periphery in tucking zone B so that the web can be tucked around the clamp bar assemblies. Then, in zone C, the cam track moves the clamp bars 30 closer to the drum periphery, so that the web can be clamped against sealing stations 16 to hold the web against sealing stations 16 as the drum continues to rotate.

Briefly, the operation of the apparatus as shown in FIG. 1, will be described as beginning with the drum 12 rotating counter clockwise about its longitudinal axis at a fixed rate of speed.

U-folded web 15 passes over a series of rollers, including a dancer roll 13, idler rolls 11, and drive rollers 17, and onto the surface of drum 12. Lay-on of the web occurs as the drum rotates through zone A.

It should be appreciated that web 15 is continuously supplied to the surface of the drum at a constant speed which is greater than the peripheral speed of the drum. This necessitates that the web be tucked with respect to the periphery of the drum in order to compensate for this speed differential. This tucking is accomplished as the film enters and proceeds through zone B. In zone B, clamp bar assemblies 29 are brought close to the drum periphery. As the web on the drum passes through tucking zone B, the cam operated tucking rolls 24 move radially outward against surface of the web facing the drum periphery so as to tuck the web into progressively deeper tucks extending outward from the drum periphery and about the adjacent clamp bar assemblies. This tucking operation consumes an amount of web material needed to compensate for the difference between the speed at which the web is supplied to the drum and the peripheral speed of the drum.

The ratio between the drum speed and the peripheral speed of the drum is fixed. Accordingly, in order to appropriately match the web speed with the peripheral speed of the drum, it should be appreciated that both the total length and the tension, of the web contained in the tucking zone B at any given instant, should remain constant. In other words, the length of the web within the tucking zone, and the tension of the web in the zone, must remain substantially constant throughout the time that the web is continuously entering and leaving the zone. The length of the web in the tucking zone, and therefore the tension on the web, is determined by the contour of a cam track 50 on cam 26. An important feature of the cam is that the contour of cam 26 is such that the number and depth of the tucks formed by the tucking rolls acting responsive to the cam surface, establish an accumulative length of web within the tucking zone which is sufficient to compensate for the difference between the web speed and the drum speed, and which is substantially constant throughout the time that the web is continuously entering and leaving the tucking zone. This feature, as well as other features of the machine described but not claimed herein are subject of a copending application Ser. No. 571,067, filed Jan. 16, 1984, now U.S. Pat. No. 4,557,713 issued Dec. 10, 1985.

At the end of tucking zone B, clamp bars 30 are brought to bear against sealing stations 16 for the purpose of clamping portions of web 15 to the periphery of the drum. As the drum continues to rotate, the drum and tucked web enter the tension relieving zone C. The contour of cam 26 in zone C allows for a slight radial inward movement of tucking rollers 24 so as to relieve tension on the tucked and clamped web. After tension on the web is relieved, in zone C, the drum and web move through zone D where wires 22 are moved radially outward by another cam (not shown in FIG. 1) to sever and seal the portions of the web clamped at each sealing station 16. In this manner, the web tucked between adjacent sealing stations 16 forms the individual bags. The width of each bag corresponds to the length of the web extending from a leading sealing bar 20 of one sealing station 16 and around a tucking roll 24 to a trailing sealing bar 18 of the next adjacent sealing station 16.

As is customary in the art, each of the drum sealing bars 18, 20 is provided with a connection to a vacuum source (not shown). The vacuum applied to the sealing bars assists in holding the bags to the drum sealing bars as the bags approach the take-off zone F. As the drum rotates through take-off zone F, the vacuum is dropped from each trailing sealing bar 18 while the vacuum is maintained with respect to each leading sealing bar 20. This causes the trailing edge of each bag 31 to swing free of the drum, as shown in FIG. 1, wherein the leading edge of the bag is held to the drum surface by the vacuum on drum sealing bar 20. With the bags in this position, they may be transferred to a conventional transfer drum 32 which removes the bags from drum 12 and carries them to a conventional accumulator until an appropriate number have been gathered, after which the bags are transferred to packaging apparatus, also conventional and therefore not shown.

Figure 2:
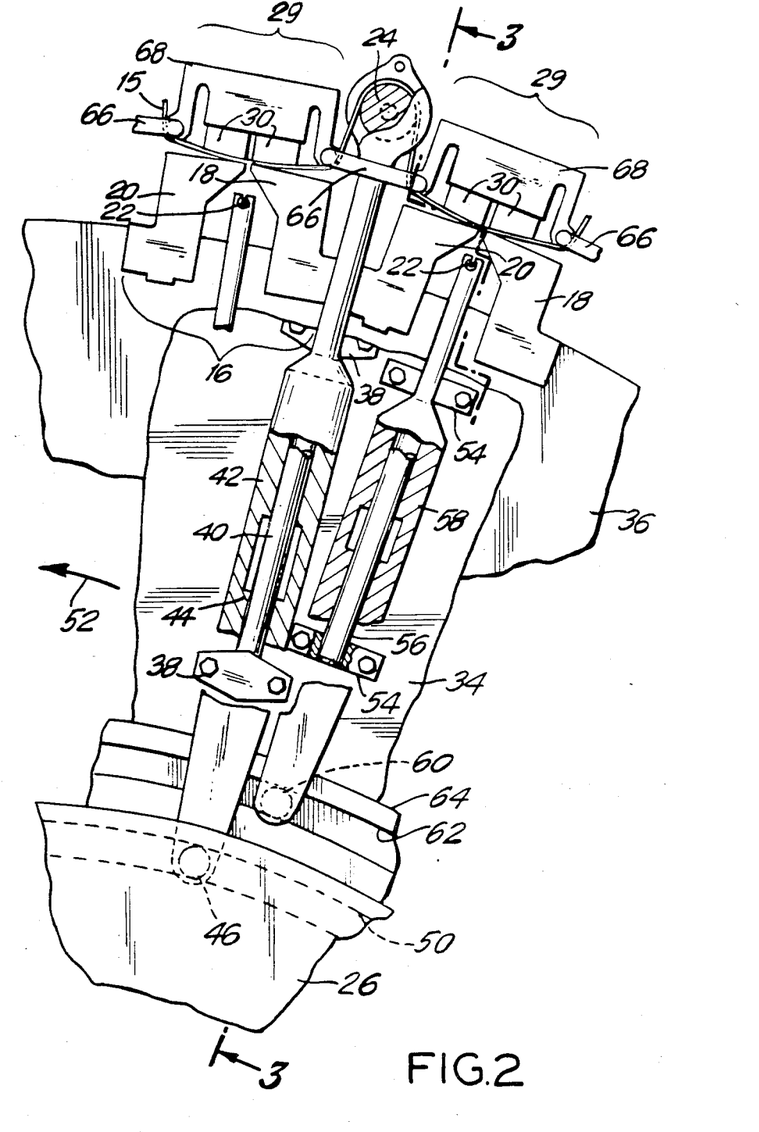
FIG. 2 is a view on an enlarged scale, showing in more detail, a portion of the apparatus shown in FIG. 1.

Referring to FIG. 2, the rotating drum is shown to include front and rear sidewalls 34, 36, respectively. The drum sealing bars 18, 20, are connected to, and extend across, these sidewalls so that the bars form the spaced sealing stations 16.

Each tucking roll 24 and sealing wire 22 is supported by means which are attached to the outboard surface of each sidewall 34, 36. For purposes of illustration, one such means for a tucking roll and a sealing wire is shown in FIG. 2. It should be appreciated that such means as described hereafter as being attached to the outboard side of the wall 34 is duplicated on the other side of the drum for attachment to the outboard side of wall 36, and that similar means are provided for supporting each of the tucking rolls and sealing wires.

Figure 3:
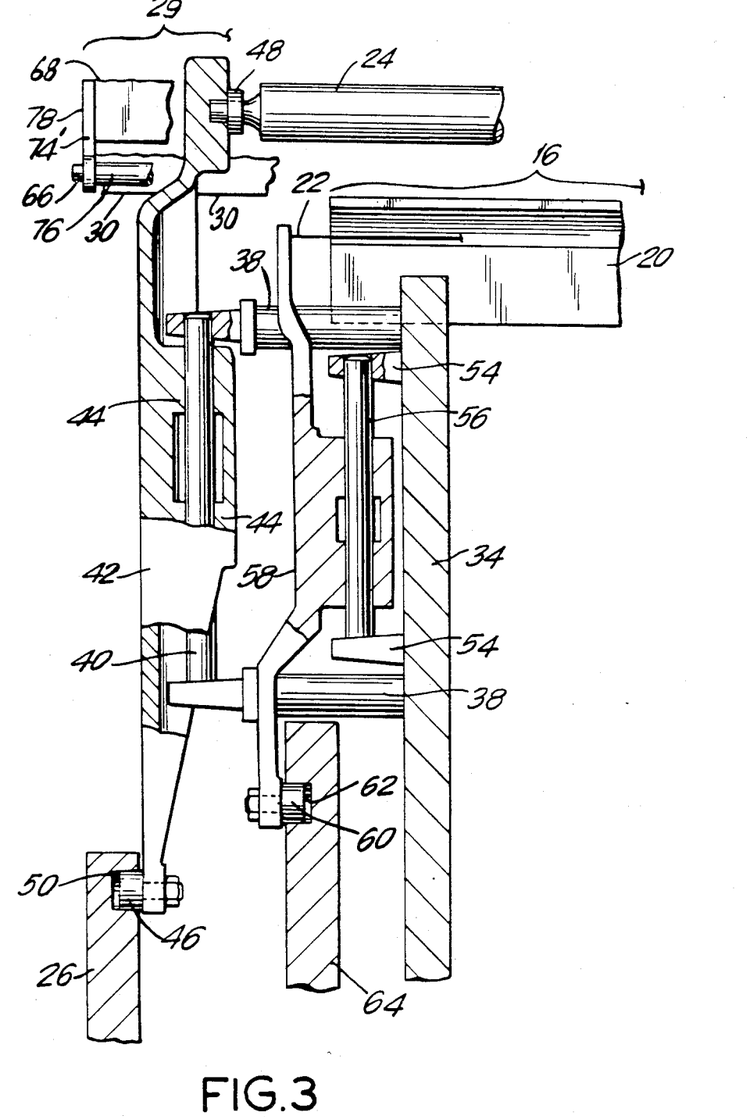
FIG. 3 is a view taken generally along lines 3—3 of FIG. 2, with various components being omitted for purposes of clarity.

With reference to FIGS. 2 and 3, the means for supporting each tucking roll 24 to provide radial reciprocation with respect to the rotating drum includes a pair of radially spaced brackets 38, which are attached to drum wall 34. These brackets extend outwardly from wall 34 and support a guide rod 40.

Carried by guide rod 40 is an elongated tucker arm 42. This arm has spaced bearings 44 which slidably embrace the guide rod 40. In addition, one end of arm 42 carries a cam follower 46 and the other end of the arm is provided with a journal 48 (FIG. 3) for rotatably supporting an end of tucking roll 24.

The cam follower 46, rides in a cam track 50 which is formed in cam 26. As set out hereinabove, cam 26 is fixed with respect to the frame of the bag making apparatus. Consequently, as the drum rotates in the direction indicated by arrow 52 (FIG. 2) the tucking arm 42 also is rotated about the cam. In this manner, the interaction of cam follower 46 and cam track 50 control the radial movement of the tucking arm 42, and thereby tucking roll 24.

A similar means is provided for supporting each sealing wire 22. In this respect, there are a pair of radially spaced brackets 54 fixed to the outer surface of each drum wall. A guide rod 56 is held at its ends by the brackets 54.

Slidably carried by rod 56 is a sealing wire support arm 58. One end of the support arm carries sealing wire 22 and the other end of the arm carries a cam follower 60. Cam follower 60 in turn rides in a cam track 62 formed in a cam 64. This cam 64 is fixed with respect to the frame of the apparatus so as to control the radial movement of sealing wire support arm 58.

FIGS. 2 and 3 also show that the endless chain 28 of FIG. 1 includes elongated chain links 66. These links connect clamp bar assemblies 29 and each link is long enough to permit a tucking roll 24 to pass between adjacent clamp bar assemblies.

Figure 4:
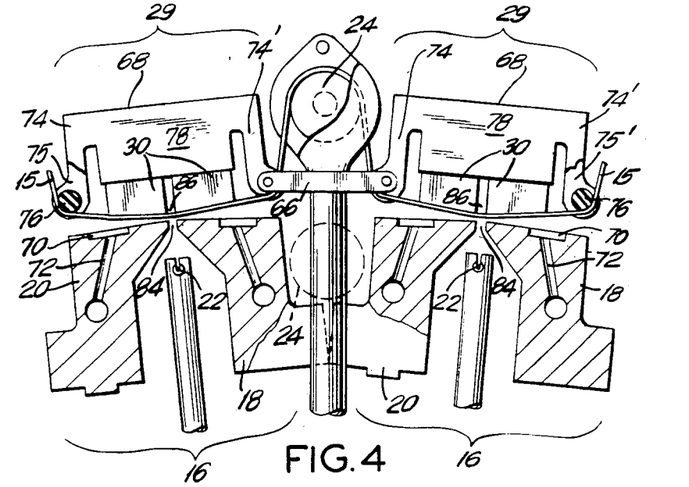
FIGS. 4 and 4a are views, on an enlarged scale and partly in section, of a portion of the apparatus shown in FIG. 2, the Figures showing successive stages of operation.

Referring to FIG. 4, sealing stations 16 and clamp bar assemblies 29 are shown in more detail. The Figure also shows the relative position of these components as the drum passes through the tucking zone B. Each of the sealing bars 18, 20 has a port 70 opening through the outer surface of the sealing bar. This port is connected by means of appropriate passages 72 to a source of vacuum as is conventional in the art. By drawing a vacuum in these ports, web 15 can be held to the sealing bars.

Each clamp bar assembly 29 includes a housing 68 having a leading pair of depending leg members 74, 75, a trailing pair of depending legs 74', 75' and side walls 78. Chain links 66, which connect the housings, are journaled to the outboard sides of the depending legs. Extending between the inboard side each leading and trailing pair of legs is a freewheeling roller bearing 76. These roller bearings facilitate the relative friction-free passage of web 15 as the web is being tucked outwardly between adjacent housings 68 by tucking rollers 24.

Figure 4A:
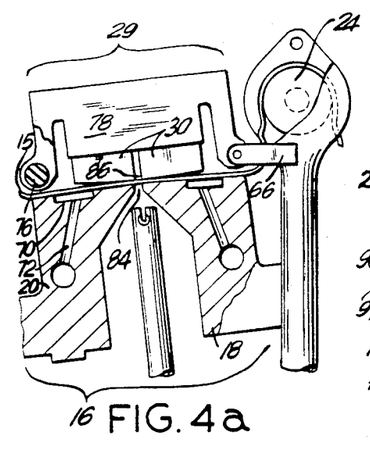

A pair of clamp bars 30 are disposed in each housing 68. In the tucking zone, as represented in FIG. 4, the endless chain is positioned so clamp bars 30 do not contact the sealing stations on the drum periphery. This allows the web to move between the clamp bars and sealing bars during the tucking operation. Thereafter, in clamping and tension relief zone C, as represented in FIG. 4a, the chain is moved closer to the drum periphery so the clamp bars can clamp the fully tucked web to the sealing stations. Preferably, the clamp bars 30 are arranged to yield into the housing as the clamp bars are brought into registry with the drum sealing bars 18, 20. After clamping occurs, the tucking roll 24 is retracted slightly as shown in FIG. 4a to relieve tension on the clamped web. This tension relief is required prior to the subsequent severing and sealing of the web to prevent excessive pull back to the severed edge.

As the drum rotates through zone A (FIG. 1), where web 15 is laid on the drum, tucking rolls 24 are positioned below the peripheral surface of the drum. This is represented in FIG. 4 by showing, in dotted line, the position of roller 24 in what is termed a home position nested between the trailing and leading sealing bars 18, 20 respectively, of adjacent sealing stations 16. In this position, tucking rollers 24 do not interfere with the feeding of the web onto the rotating drum and the web is laid directly over the sealing stations 16 and the rolls 24 nested between the stations. Thereafter, operation of the tucker rolls will contact the rolls against the surface of the web facing the drum periphery for tucking the web out from the drum periphery.

As previously stated, the web 15 is laid onto the surface of the drum at a speed which is greater than the peripheral speed of the drum. To compensate for this speed differential the web is tucked outwardly from the periphery of the drum in progressively deeper folds as the drum rotates through tucking zone B (FIG. 1). Accordingly, in zone B, there is a relative movement between the web and the periphery of the drum which is why there must be no clamping of the web in the tucking zone. This relative movement is greatest upon entering the zone and is equal to the differential between the web speed and the peripheral speed of the drum. This speed differential diminishes as the web is tucked into progressively deeper tucks until the web and drum are moving at the same speed at the end of the tucking zone.

FIGS. 4 and 4a also show a small gap 84, between sealing bars 18, 20 and a similar gap 86 between clamp bars 30. The gaps 84, 86 align when clamp bars 30 are in registration with the drum sealing bars 18, 20. This alignment permits sealing wire 22 to move radially through the aligned gaps 84, 86 to sever and seal the web as the drum rotates through zone D, thereby forming individual bags from the tucked web.

FIG. 4 illustrates the advantage of tucking the web outwardly from the periphery of the drum, as opposed to tucking it inwardly. In this respect, moving tucking rolls 24 outwardly from the periphery of the drum from the dotted-line position to the solid-line position, moves these rolls outwardly from a crowded area to a less crowded area. That is, the arc distance between rolls 24 increases as the rolls move outward from the drum periphery. This provides greater flexibility for the depth of the tuck. Tucking outwardly as described herein has the further advantage of simplifying the tucking mechanism because no provision needs to be made for moving the tucking members aside as the web is laid onto the periphery of the drum.

As stated hereinabove, it is important for various considerations to be able to adjust the depth of tuck. In this respect the depth of tuck determines the size of the bag and more particularly, the width of the bag. The depth of the bag is not a factor and is determined by the width of the thermoplastic web which is folded to form the U-folded web 15 which is continuously supplied to the machine.

Once the manufacture of a given size bag is commenced, it is important to be able to make fine adjustments should the bags be found to be oversized or undersized. To applicant's knowlege, such fine adjustment is not possible with the bag making apparatus of the prior art, even with those bag making apparatus which utilize a cam-controlled tucking roller as shown for example in U.S. Pat. Nos. 4,115,183 and 4,331,502.

As disclosed herein, such fine adjustment is made quickly and easily with minimum of machine downtime and without the need to vary the speed with which the web is applied to the periphery of the drum. This is accomplished in general by arranging the cam so it can be translated in a radial direction. Moving the cam radially with respect to the drum axle will increase the depth of tuck whereas adjustment in the opposite direction will decrease the depth of tuck. The adjustable cam per se is not part of the present invention and is claimed in a copending application Ser. No. 571,067 filed Jan. 16, 1984.

Figure 5:
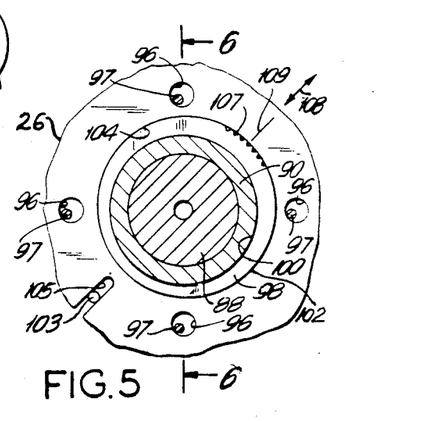
FIG. 5 is a view taken along line 5—5 of FIG. 6 showing a cam adjustment means.
Figure 6:
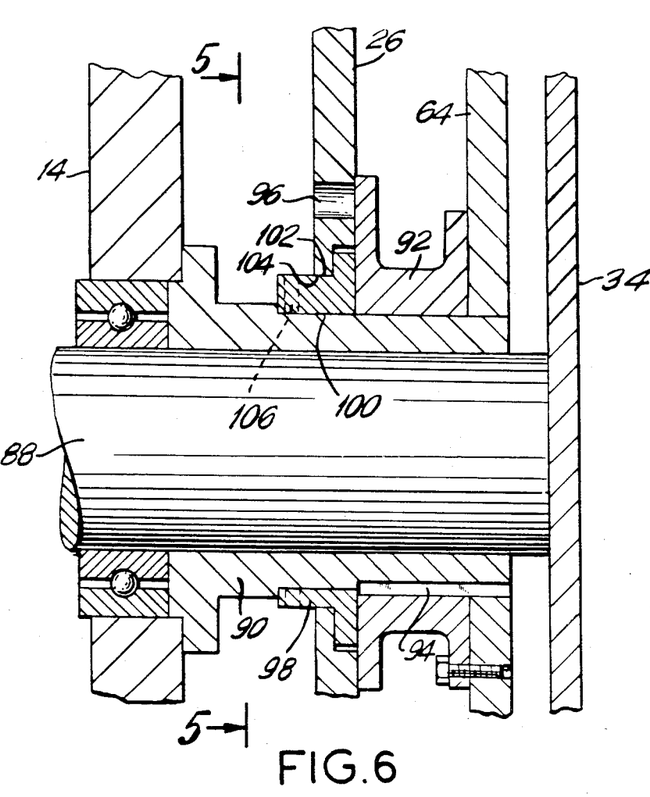
FIG. 6 is a view taken along lines 6—6 of FIG. 5.

One embodiment of such an adjustment mechanism is shown in FIGS. 5 and 6. Referring first to FIG. 6, a sidewall 34 of the drum is fixed to the drum axle 88, which in turn, is journaled to the frame 14 of the apparatus. Fixed to frame 14 and disposed about axle 88 is sleeve 90. This sleeve 90 carries a hub 92 which is keyed to sleeve 90 at 94 in order to prevent the hub from moving with respect to the sleeve. Fixed to one face of hub 92 is the sealing wire cam 64. Fixed to the other face of the hub is the tucker roll cam 26. The attachment of the tucker roll cam 26 to the hub is accomplished by means of four bolts 97 (FIG. 5) wherein each bolt extends through an enlarged circular opening 96 in the cam and threads through an appropriate threaded opening in the hub.

Carried by sleeve 90 is an eccentric 98. The eccentric is generally annular wherein its inside surface 100 is concentric to the outside surface of sleeve 90 on which it rides. The outside surface 102 of the eccentric, while being circular, is eccentrically oriented with respect to its inside surface 100. This is best seen in FIG. 5.

Cam 26 has a central opening 104 which is substantially equal in diameter to the outside surface 102 of the eccentric. With this arrangement, holding the cam while rotating the eccentric about sleeve 90 will produce a radial adjustment of the cam.

Preferably, this radial adjustment is limited to a path of travel which is parallel to the radius of the cam which passes through the center of the lift section of the cam (see arrow 108 in FIG. 5). The lift section of the cam track is the portion of the cam which provides for the radial movement of tucking rolls 24 as the drums rotate through tucking zone B. Thus, the path of cam adjustment is along a path which passes through the tucking zone so that adjustment of the cam along the path as described, insures that the lift of the cam is adjusted while avoiding significant changes in the angular positioning of the tucking zone B.

Adjustment of the cam when using the arrangement as shown in FIGS. 5 and 6 is accomplished simply by loosening bolts 97 (FIG. 5) which hold the cam to hub 92. Thereafter, rotation of the eccentric 98 about sleeve 90 will work to adjust the cam in a radial direction. Notches 107, or other appropriate indicator means on the eccentric can be provided to show the amount of rotation and therefore, the radial adjustment of the cam with respect to a reference mark 109 on the cam.

Thus, if it is found during manufacture of the bag that the bag is over or under sized, the amount of the tuck can be increased or decreased in order to provide the proper bag size simply by making an appropriate rotation of the eccentric to, in effect, increase or decrease the throw of the cam which, in turn, adjusts the radial movement of the tucker arms. The rotational adjustment of the eccentric is facilitated by spanner holes 106, provided at spaced intervals around the eccentric to accommodate a spanner wrench or similar tool.

To insure a proper operation of the tucking mechanism after cam adjustment, the adjustment should move the cam in its own plane along a path which extends parallel to the direction indicated by arrow 108. The adjustment, preferably, should be accomplished without any rotational component of motion. To minimize arcuate displacement of the cam during adjustment of the eccentric a pin and a guide slot arrangement 103, 105 is provided wherein the sides of the slot are generally in line with, and parallel to, the desired path of cam adjustment as represented by arrow 108.

Figure 7:
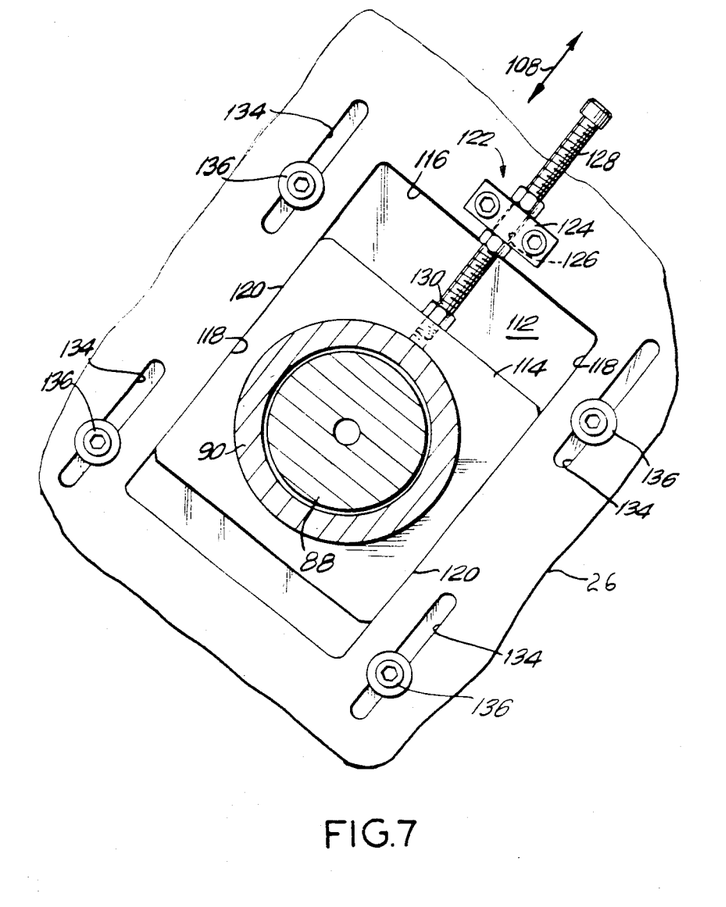
FIG. 7 is a view taken along lines 7—7 of FIG. 8, showing still another embodiment of the cam adjustment means.
Figure 8:
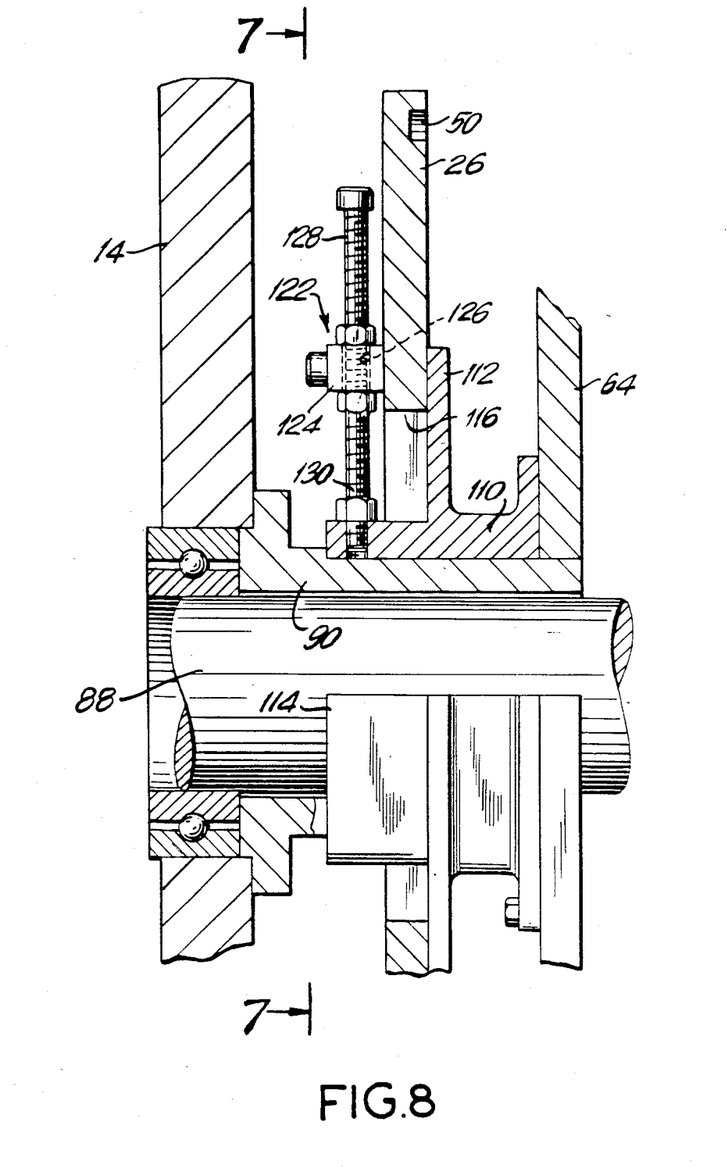
FIG. 8 is a side elevation view of FIG. 7 partly in section and showing additional structure.

The embodiment of the cam adjusting means shown in FIGS. 7 and 8 provides for a rectilinear adjustment of the cam without any rotational component of motion. As shown in FIG. 8, this embodiment also includes a sleeve 90 which is fixed to the frame 14 of the apparatus. A hub 110 is carried by and fixed to sleeve 90. As with the embodiment shown in FIG. 5, the sealing wire cam 64 is fixed to one face of the hub.

A radial flange 112 on the hub provides backing support for the tucker cam 26. In addition the hub includes an axially extending guide portion 114. The outer surface of this guide portion is generally a square or rectangular configuration as best seen in FIG. 7.

The guide portion 114 has parallel sides 120. These sides are oriented in the direction of the desired path of travel as represented by arrow 108, and the sides extend through an elongated opening 116 in cam 26. The elongated sides 118 of this opening are in a tight sliding engagement with the corresponding sides 120 of the hub guide portion so that adjustment of the cam is limited to a path of travel which extends parallel to the direction represented by arrow 108.

The adjustment of cam 26 can be accomplished by any appropriate means such as a jack screw mechanism, generally indicated at 122, which is operatively connected to both the cam and the hub. In this respect, the cam is provided with a shoulder 124 which has a through bore 126. A jack screw 128, extending through this bore has one end 130 connected to hub 110. With this arrangement, adjustment of the jack screw mechanism 122 will work to lift or lower cam 26.

Cam 26 is also provided with four elongated openings 134 (FIG. 7) to accommodate passage of bolts 136. These bolts, in turn, are threaded into screw holes (not shown) provided in flange 112 so that the cam can be fixed in its adjusted position.

It should be appreciated that the sliding engagement of the straight sides of the hub and cam opening cooperate to limit the movement of the cam to the desired rectilinear path, and that such movement is free of any rotational component of motion.

Figure 9:
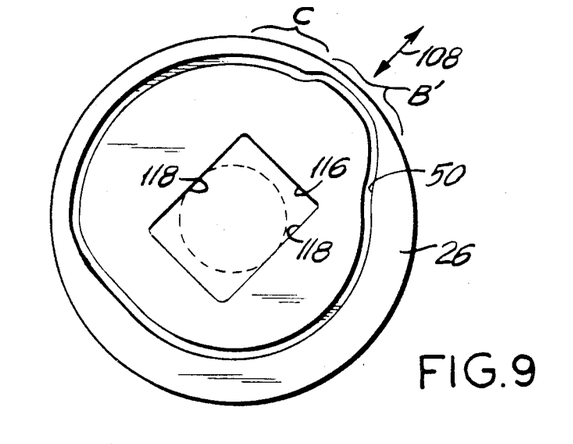
FIG. 9 is a view showing the configuration of a cam as may be used with the apparatus of the present invention.

FIG. 9 shows a cam 26 of a type suitable for use in the present invention. The track 50 which controls the radial movement of tucking rolls 24 has a lift or riser section B' providing for the lift of the tucking rolls as the drum 12 (FIG. 1) rotates through tucking zone B. As can be seen in FIG. 9, the direction of cam adjustment as represented by arrow 108 extends generally through the center of this lift section. The cam can have an elongated, rectangular opening 116, as shown in solid line, suitable for use with the adjustment mechanism as shown in FIGS. 7 and 8, or it can have a circular opening, as shown in dotted line, for use with the adjustment mechanism as shown in FIGS. 5 and 6.

Thus it should be appreciated that the present invention provides a bag making machine of the rotating drum type having a simplified and improved tucking system wherein the web is tucked radially outward from, and beyond the periphery of the drum. Tucking the web outwardly simplifies the tucking mechanism as there is no need to move the tucking members aside in order to lay the web onto the drum surface. Instead, the web is laid directly onto the surface of the drum and across the tucking rolls which are nested at or below the drum periphery.

The adjustable cam feature permits fine adjustment in order to bring oversized or undersized bags within specified tolerances, such adjustment being accomplished with a minimum of machine downtime. This feature also permits greater cam adjustments so that bags of various sizes can be made on the machine wherein the width dimension of one bag size is less than a full multiple of another bag size.

Having described the invention in detail, what is claimed as new is:

1. Apparatus for making bags from a folded web of thermoplastic material comprising:
   (a) a frame;
   (b) a rotatable drum mounted to said frame for rotation about a longitudinal axis, said drum having an outer periphery adapted to receive a web of thermoplastic material;

(c) clamp means spaced from and extending about at least a portion of said drum outer periphery for contacting the web at spaced intervals and pressing it towards said drum outer periphery;

(d) support means carried by said drum and mounted thereto for movement along a radial path of travel relative to said drum, said support means having a first end and a second end;

(e) cam means fixed on said frame and contacting said support means first end for moving said support means along said path of travel as said drum rotates;

(f) tucker rolls attached to said support means second end and disposed at locations between said spaced intervals, said tucker rolls being guided by said support means for movement along a radial path from and between a position adjacent said drum periphery and an outwardly extending position spaced from and beyond said drum periphery, thereby contacting said tucker rolls against a surface of the web which faces said drum periphery and tucking the web outwardly from said drum periphery; and (g) hot wire means carried by said drum and operable to sever and seal the web at said spaced intervals.

2. Apparatus as in claim 1 wherein said drum has spaced side walls and said support means is mounted to a surface of each of said side walls, each tucker roll being elongated with its opposite ends connected to said support means such that each tucker roll extends across the drum periphery.

3. Apparatus as in claim 2 wherein said drum has a plurality of sealing stations spaced about the drum periphery, each sealing station including a pair of substantially parallel sealing bars which extend from one drum side wall to the other and wherein:

(a) said tucker rolls are positioned between adjacent sealing stations so the path of travel of said tucker rolls extends from a position generally nested between adjacent sealing stations to said outwardly extending position; and (b) said support means and cam means are arranged to move said tucker rolls to said nested position as a web is supplied to said drum periphery so that the web will pass over said sealing stations and tucker rolls.

4. Apparatus as in claim 2 wherein said support means includes:

(a) a radially extending guide rod fixed to and supported outwardly from each side wall;

(b) a tucker arm slidably carried by each guide rod, each arm having an upper and a lower end wherein the upper end of each tucker arm is connected to an end of said tucker roll.

5. Apparatus as in claim 4, including a journal between said tucker rolls and tucker arms so that said rolls are free to rotate about a longitudinal axis.

6. Apparatus as in claim 4, including cam follower means at the lower end of each tucker arm and engaging said cam means for controlling the movement of said arm along said radially extending guide rod.

7. Apparatus as in claim 1 wherein said cam means is adjustable relative to said frame so as to increase or decrease the maximum extent of said tucker rolls outward from said drum periphery.

8. A bag making apparatus comprising:

(a) a drum rotatable about its longitudinal axis and carrying a plurality of sealing stations at intervals about its outer circumferential periphery, said sealing stations defining spaces therebetween and providing surfaces for receiving a web of thermoplastic bag making material laid onto said surfaces and spanning said spaces, each of said sealing stations including hot wire means for severing and sealing the web;

(b) clamp means disposed about at least a portion of said drum periphery for pressing on the web and clamping it to said sealing stations;

(c) hot wire means at each sealing station operable after said clamping for severing and sealing the web;

(d) tucker rolls carried by said drum in a generally nested position in the spaces between said sealing stations and being mounted to said drum for guided radial movement relative to said drum from and between said nested position and a second position spaced radially outward from and beyond said drum periphery;

(e) fixed cam means mounted in a plane generally perpendicular to the longitudinal axis of said drum and operatively connected to said tucker rolls for moving said tucker rolls along said radial path as said drum rotates about said longitudinal axis;

(f) said cam means being arranged for moving said tucker rolls to said second position prior to the clamping of the web, thereby tucking the web radially outward from the sealing stations at the drum periphery; and (g) said cam means being arranged for moving said tucker rolls towards said nested position after the clamping of the web and prior to operation of said hot wire means thereby relieving tension on said web prior to the severing and sealing of the web.

9. A method of making bags from a web of thermoplastic material comprising the steps of:

(a) feeding a thermoplastic web onto the periphery of a rotating drum at a speed greater than the peripheral speed of the drum;

(b) tucking the web into folds with respect to the drum periphery to compensate for the difference between the drum speed and the web speed, said tucking being accomplished by providing the drum with a plurality of radially movable tucking rolls and extending the rolls radially outward from the drum and pressing the rolls against the web surface facing the drum, thereby forming the web into tucked portions which extend radially outward from the drum periphery;

(c) while maintaining the tucking rolls pressing against the web, clamping the web to the drum periphery at locations between the tucked portions;

(d) after clamping, relieving the pressing on the web by moving the tucking rolls radially inward towards the drum periphery; and (e) severing and sealing the web at the clamped locations.

10. A method as in claim 9 including the steps of (a) tucking the web in successively deeper tucks as the drum rotates through a defined arc segment;

(b) clamping the web at the end of said arc segment when the depth of tuck is at a maximum; thereafter (c) moving the tucker rolls towards the drum periphery as said drum rotates through a further arc segment; and thereafter (d) severing and sealing the web as said drum rotates through still a further arc segment.

* * * * *

UNITED STATES PATENT AND TRADEMARK OFFICE
CERTIFICATE OF CORRECTION

PATENT NO. : 4,609,367

DATED : September 2, 1986

INVENTOR(S) : Peter R. Savich et al.

It is certified that error appears in the above-identified patent and that said Letters Patent is hereby corrected as shown below:

Column 5, line 25 - delete the word "drum" and substitute the word --"web"--.

Signed and Sealed this

Seventeenth Day of May, 1988

*Attest:*

DONALD J. QUIGG

*Attesting Officer*  *Commissioner of Patents and Trademarks*